United States Patent
Miao et al.

(10) Patent No.: US 11,356,030 B2
(45) Date of Patent: Jun. 7, 2022

(54) SWITCHING POWER SUPPLY CIRCUIT WITH SYNCHRONOUS RECTIFICATION AND ASSOCIATED CONTROL CIRCUIT AND CONTROL METHOD

(71) Applicant: Chengdu Monolithic Power Systems Co., Ltd., Chengdu (CN)

(72) Inventors: Lei Miao, Hangzhou (CN); Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 24 days.

(21) Appl. No.: 16/953,700

(22) Filed: Nov. 20, 2020

(65) Prior Publication Data

US 2021/0175817 A1 Jun. 10, 2021

(30) Foreign Application Priority Data

Dec. 10, 2019 (CN) .......................... 201911254525.7

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ......... H02M 3/33592; H02M 3/33507; H02M 1/08; H02M 1/0051; H02M 1/0054; Y02B 70/10
See application file for complete search history.

(56) References Cited

U.S. PATENT DOCUMENTS

| | | |
|---|---|---|
| 8,102,680 B2 | 1/2012 | Ren et al. |
| 8,976,547 B2 | 3/2015 | Ren et al. |
| 9,379,630 B2 | 6/2016 | Miao |
| 9,397,577 B2 | 7/2016 | Wang et al. |
| 9,407,151 B2 | 8/2016 | Zhang et al. |
| 10,348,182 B2 | 7/2019 | Wang |
| 10,432,104 B2 | 10/2019 | Li et al. |
| 10,673,344 B2 | 6/2020 | Wang |
| 2016/0190948 A1* | 6/2016 | Yang ........................ H02M 1/32 363/21.14 |
| 2019/0020282 A1* | 1/2019 | Li ........................... H02M 1/08 |
| 2020/0028441 A1 | 1/2020 | Miao |
| 2020/0153352 A1 | 5/2020 | Wang |
| 2020/0161985 A1* | 5/2020 | Li ........................... H02M 1/08 |

\* cited by examiner

*Primary Examiner* — Kyle J Moody
*Assistant Examiner* — Jye-June Lee
(74) *Attorney, Agent, or Firm* — Perkins Coie LLP

(57) ABSTRACT

A switching power supply circuit with synchronous rectification has an energy storage component, a SR switch coupled to a secondary side of the energy storage component, and a secondary control circuit. The secondary control circuit has a turning-ON control circuit for providing a turning-ON control signal based on a comparison of a drain to source sensing voltage of the SR switch and a turn ON threshold, a mode determination circuit for providing a mode signal to determine a turn ON delay based on a detection to a transient event or the drain to source sensing voltage ringing of the SR switch, and a gate driver circuit for driving the SR switch. When the turning-ON control signal is asserted, the gate driver circuit charges a gate voltage of the SR switch after the turn ON delay based on the mode signal, to turn ON the SR switch.

20 Claims, 8 Drawing Sheets

SWITCHING POWER SUPPLY CIRCUIT WITH SYNCHRONOUS RECTIFICATION AND ASSOCIATED CONTROL CIRCUIT AND CONTROL METHOD

CROSS-REFERENCE TO RELATED APPLICATIONS

This application claims the benefit of CN application 201911254525.7, filed on Dec. 10, 2019, and incorporated herein by reference.

TECHNICAL FIELD

The present invention relates generally to electrical circuits, and more particularly, relates to switching power supply circuits with synchronous rectification.

BACKGROUND

In an isolated switching power supply, an input voltage is received at a primary side of a transformer, and a diode at a secondary side of the transformer is replaced by a controllable synchronous rectifier (SR) switch. This synchronous rectification scheme is widely used at the secondary side of the isolated switching power supply because of its high conversion efficiency.

In the isolated switching power supply, a drain to source voltage of the SR switch at the secondary side may be adopted to determine the ON and OFF of the SR switch. A slew rate of the drain to source voltage of the SR switch is also detected to avoid the false trigger due to the ringing of the drain to source voltage of the SR switch at the same time. However, with the increase of switching frequency of the isolated switching power supply, a slew rate of the drain to source voltage ringing becomes closer to the slew rate of the drain to source voltage when it is normally turned ON. As a result, accurate turning ON of the SR switch is in demand for application with increased switching frequency.

SUMMARY

Embodiments of the present invention are directed to secondary control circuits used in a switching power supply circuit with synchronous rectification. The switching power supply circuit comprises an energy storage component and a SR switch coupled to a secondary side of the energy storage component. The SR switch has a drain terminal, a source terminal and a gate terminal. The secondary control circuit comprises a turning-ON control circuit, a mode determination circuit and a gate driver circuit. The turning-ON control circuit is configured to provide a turning-ON control signal based on a comparison of the drain to source sensing voltage of the SR switch and a turn ON threshold. The mode determination circuit is configured to provide a mode signal to determine a turn ON delay based on based on a detection to a transient event or the drain to source sensing voltage ringing of the SR switch. The mode signal has a first level indicating a fast mode and a second level indicating a slow mode. The gate driver circuit is configured to drive the SR switch, wherein when the turning-ON control signal is asserted, the gate driver circuit charges a gate voltage of the SR switch after the turn ON delay based on the mode signal, to turn ON the SR switch.

Embodiments of the present invention are directed to methods to control a SR switch in a switching power supply circuit including an energy storage component coupled to the SR switch. The SR switch comprises a drain terminal, a source terminal and a gate terminal. The method comprises generating a turning-ON control signal based on comparing a drain to source sensing voltage with a turn ON threshold, generating a mode signal to determine a turn ON delay by detecting a transient event or the drain to source sensing voltage ringing of the SR switch, and when the turning ON control signal is asserted, charging a gate voltage of the SR switch after the turn ON delay based on the mode signal, to turn ON the SR switch. The mode signal is high level indicating a slow mode and is low level indicating a fast mode.

BRIEF DESCRIPTION OF THE DRAWING

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
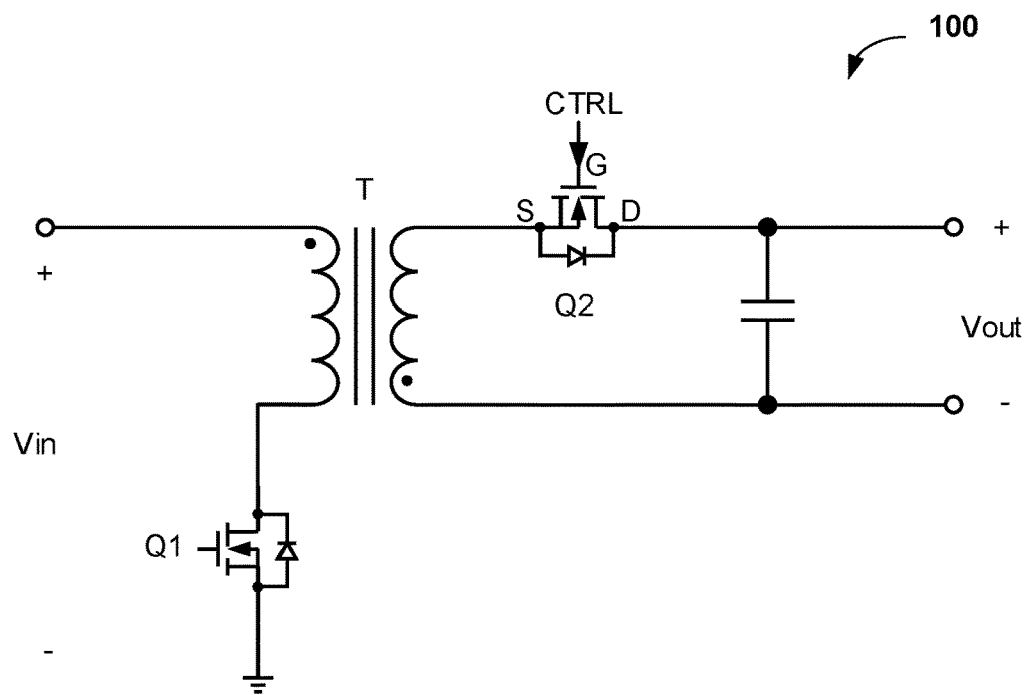
FIG. 1 schematically illustrates a flyback converter 100 with synchronous rectification.

In the following description, a flyback converter with synchronous rectification, as an example, is considered to describe a problem to be solved by this invention. FIG. 1 schematically illustrates a flyback converter 100 with synchronous rectification.

The flyback converter 100 shown in FIG. 1 has a transformer T, a primary switch Q1 coupled to a primary side of the transformer T, and a SR switch Q2 coupled to a secondary side of the transformer T. The primary side of transformer T receives an input voltage Vin, and the secondary side of the transformer T provides an output voltage Vout. The SR switch Q2 comprises a drain terminal D, a source terminal S and a gate terminal G. A drain to source voltage VDS of the SR switch Q2 is detected to generate a secondary control signal CTRL for turning-ON and turning-OFF of the SR switch Q2.

Figure 2:
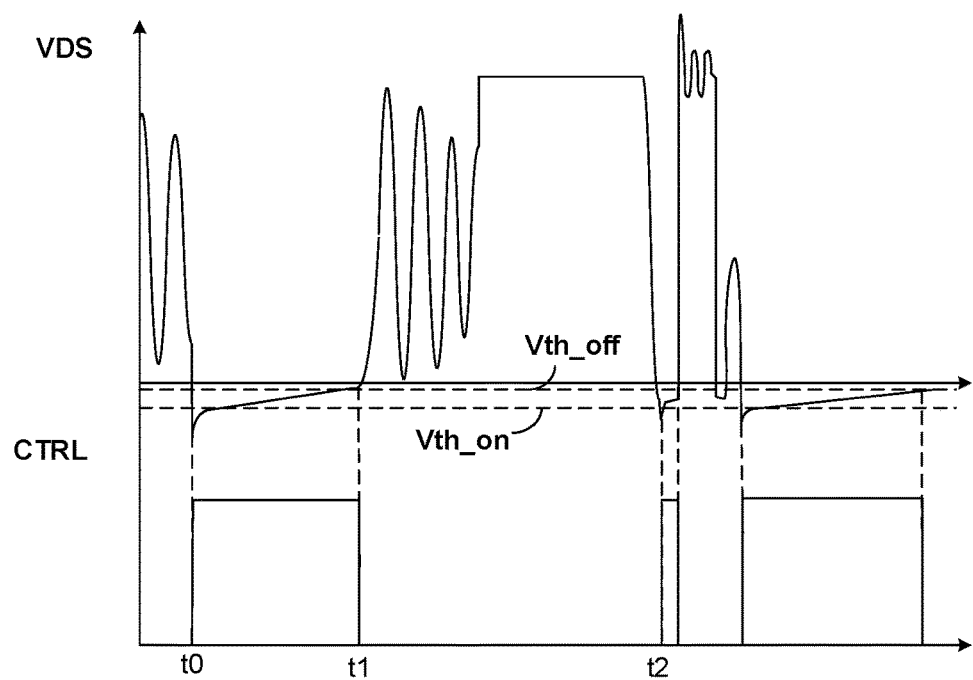
FIG. 2 illustrates working waveforms of the flyback converter 100 shown in FIG. 1 in discontinuous current mode (DCM) operation.

FIG. 2 illustrates working waveforms of the flyback converter 100 shown in FIG. 1 in DCM operation. At time t0, the primary switch Q1 is turned OFF, the energy stored in the primary side of the transformer T is transferred to the secondary side of the transformer T, a current generated on the secondary side winding flows through a body diode of the SR switch Q2, the body diode of the SR switch Q2 is forward-conducted, and the drain to source voltage VDS of the SR switch Q2 is quickly reduced to below 0V and to be a negative value. When the drain to source voltage VDS of the SR switch Q2 is decreased to reach a turn ON threshold Vth_on, the secondary control signal CTRL quickly becomes a high level, to turn ON the SR switch Q2. At time t1, the drain to source voltage VDS of the SR switch Q2 is increased to reach a turn OFF threshold Vth_off, the secondary control signal CTRL quickly becomes a low level to turn OFF the SR switch Q2. In DCM operation, the demagnetizing ringing may drop the drain to source voltage VDS below 0V. If the drain to source voltage VDS reaches the turn ON threshold Vth_on during the ringing, the SR switch Q2 may be turned ON quickly by mistake. For example, FIG. 2 shows a false turn-on situation at time t2, the drain to source voltage VDS rings below the turn ON threshold Vth_on, the secondary control signal CTRL becomes the high level, the SR switch Q2 is turned ON quickly by mistake. Not only does this increase power loss and high voltage spike, but may also lead to shoot-through if the primary switch Q1 is turned ON within the minimum on time.

Figure 3:
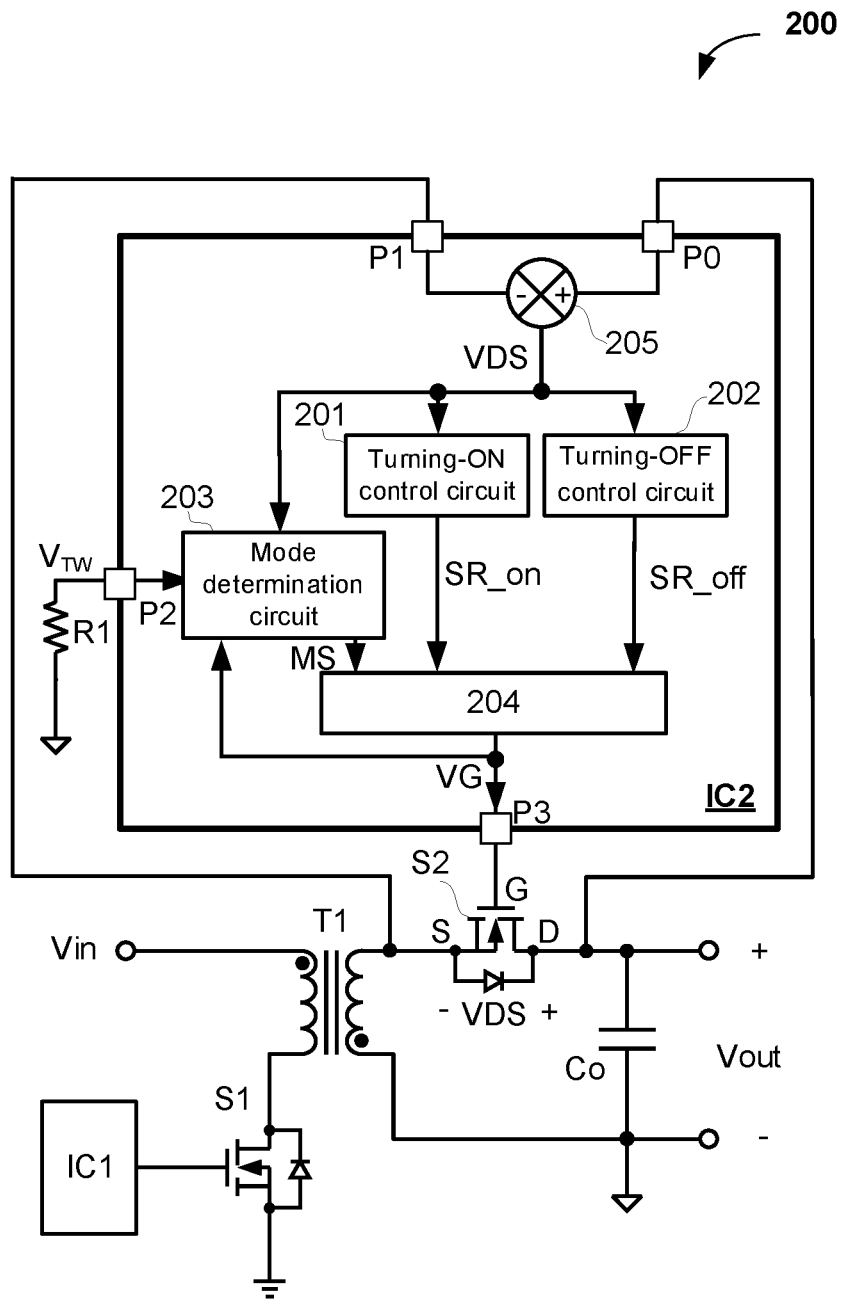
FIG. 3 illustrates a circuit block diagram of a switching power supply circuit 200 with synchronous rectification in accordance with an embodiment of the present invention.

The problem of false turn-on of the SR switch can be solved by the present invention. FIG. 3 illustrates a circuit block diagram of a switching power supply circuit 200 with synchronous rectification in accordance with an embodiment of the present invention. As shown in FIG. 3, the switching power supply circuit 200 comprises an energy storage component T1, a primary switch S1 coupled to a primary side of the energy storage component T1, a primary control circuit IC1 for controlling the primary switch S1, a SR switch S2 coupled to a secondary side of the energy storage component T1, and a secondary control circuit IC2 for controlling the SR switch S2. The primary side of the energy storage component T1 receives an input voltage Vin, and the secondary side of the energy storage component T1 provides an output voltage Vout.

In the embodiment of FIG. 3, the secondary control circuit IC2 has pins P0~P3. The secondary control circuit IC2 is configured to be an integrated circuit and to generate a secondary control signal VG at pin P3 for controlling the SR switch S2. The SR switch S2 comprises a drain terminal D, a source terminal S and a gate terminal G. The secondary control circuit IC2 comprises a turning-ON control circuit 201, a turning-OFF control circuit 202, a mode determination circuit 203 and a gate driver circuit 204. As shown in FIG. 3, the secondary control circuit IC2 has a pin P1 coupled to the S terminal of the SR switch S2 and a pin P0 coupled to the D terminal of the SR switch S2. A subtracting circuit 205 receives voltages at the S terminal and the D terminal of the SR switch S2, and provides a drain to source sensing voltage VDS of the SR switch S2 at its output terminal. In other embodiments, the drain to source sensing voltage VDS of the SR switch S2 can be sensed by other components.

The turning-ON control circuit 201 has a first input terminal, a second input terminal and an output terminal, wherein the first input terminal is configured to receive the drain to source sensing voltage VDS of the SR switch S2, the second input terminal is configured to receive a turn ON threshold Vth_on, the turning-ON control circuit 201 is configured to compare the drain to source sensing voltage VDS of the SR switch S2 with the turn ON threshold Vth_on and generates a turn ON control signal SR_on at the output terminal. In one embodiment, when the drain to source sensing voltage VDS is decreased to below the turn ON threshold Vth_on, the turning-ON control circuit 201 provides the turning-ON control signal SR_on having a high level, and the turning-ON control signal SR_on is asserted. When the turning-ON control signal SR_on has a low level, and the turning-ON control signal SR_on is de-asserted.

The turning-OFF control circuit 202 has a first input terminal, a second input terminal and an output terminal, wherein the first input terminal is configured to receive the drain to source sensing voltage VDS, the second input terminal is configured to receive a turn OFF threshold Vth_off, the turning-OFF control circuit 202 is configured to compare the drain to source sensing voltage VDS with the turn OFF threshold Vth_off, and to generate a turning-OFF control signal SR_off at the output terminal. In one embodiment, when the drain to source sensing voltage VDS is increased to above the turn OFF threshold Vth_off, the turning-OFF control circuit 202 provides the turn OFF control signal SR_off having a high value, and the turning-OFF control signal SR_off is asserted.

The mode determination circuit 203 is configured to determine a turn ON delay according to the operation of the switching power supply circuit 200. The turn ON delay indicates that how long a body diode of the SR switch S2 conducts before the SR switch S2 is turned ON. In one embodiment, the mode determination circuit 203 is configured to generate a mode signal MS, when the mode signal MS becomes high level, the mode is determined to be a slow mode, and a larger turn ON delay is selected to delay the turning-ON of the SR switch S2. When the mode signal MS becomes low level, the mode is determined to be a fast mode, and a small turn ON delay is selected to delay the turning-ON of the SR switch S2.

If any of the following situation is detected, the mode determination circuit 203 will determine the detection results as the slow mode: 1) any transient events; 2) VDS ringing of the SR switch S2. Once any transient events or VDS ringing of the SR switch S2 in DCM operation occur, the mode signal MS becomes the high level indicating the slow mode and a larger turn ON delay is determined. With a larger and appropriate turn ON delay, the body diode conduction duration of the SR switch S2 is longer, the shoot-through is avoided. When the switching power supply circuit 200 is working on a stable state without VDS ringing of the SR switch S2, the mode signal MS is the low level indicating the fast mode, the small turn ON delay is selected. With the small turn ON delay, the body diode conduction duration of the SR switch S2 is short, which improves the total efficiency. In one embodiment, to keep the body diode conduction loss on a fairly low level, the turn ON delay for the slow mode is selected to be not larger than 5% of the switching cycle of the switching power supply circuit 200.

In one hand, the mode determination circuit 203 is configured to detect a transient event. The transient event can be caused within the switching power supply circuit 200 by variations of the input voltage Vin and/or changes in a loading current. In one embodiment, in response to the detected transient event, the secondary control signal VG is regulated at least in part by varying an on-time of the SR switch Q2 during the transient events. When no transient event is detected by the mode determination circuit 203, the on-time of the SR switch Q2 is kept to be a constant value.

In one embodiment, the transient event can be detected by detecting whether a change ratio of the conduction time of the SR switch Q2 cycle by cycle exceeds a preset value (e.g., 5%). In another embodiment, the transient event can be detected by detecting a decrease of the output voltage Vout of the switching power supply circuit 200 with respect to a reference voltage. In yet another embodiment, a transient event is based on a signal representative of a peak current flowing through the SR switch Q2.

In the other hand, the mode determination circuit 203 is configured to have a slew rate detection function and is configured to detect VDS ringing of the SR switch S2 in DCM operation. In one embodiment, the VDS ringing is detected by detecting whether the time duration of the drain to source sensing voltage VDS higher than a detection threshold Vdet_th is less than a window length TW.

Those skilled in the art will appreciate that embodiments of the present invention may be practiced in other ways and the embodiments described herein are merely example embodiments of the invention.

In the embodiment of FIG. 3, the mode determination circuit 203 has a first input terminal, a second input terminal and an output terminal, wherein the first input terminal is configured to receive the drain to source sensing voltage VDS, a second input terminal is configured to receive the secondary control signal VG, and the mode determination circuit 203 is configured to provide the mode signal MS at the output terminal.

The gate driver circuit 204 has a first input terminal, a second input terminal, a third input terminal and an output terminal, wherein the first input terminal is configured to receive the mode signal MS, the second input terminal is configured to receive the turning-ON control signal SR_on, the third input terminal is configured to receive the turning-OFF control signal SR_off. The gate driver circuit 204 is configured to control the turning-ON of the SR switch S2 based on the mode signal MS and the turning-ON control signal SR_on, and is further configured to control the turning-OFF of the SR switch S2 based on the turning-OFF control signal SR_off.

In detail, when the mode signal MS is low level, the fast mode and the small turn ON delay is determined, when the turning-ON control signal SR_on is asserted, the gate driver circuit 204 starts to charge a gate voltage of the SR switch S2 after the small turn ON delay. The gate voltage of the SR switch S2 is increased to turn ON the SR switch S2. When the mode signal MS is high level, the slow mode and the larger turn ON delay is determined, once the turning-ON control signal SR_on is asserted, the gate driver circuit 204 starts to charge the gate voltage of the SR switch S2 after the larger turn ON delay. The gate voltage of the SR switch S2 is increased to turn ON the SR switch S2. When the turning-OFF control signal SR_off is asserted, the gate driver circuit 204 turns ON a discharge switch coupled between the gate terminal of the SR switch S2 and a ground, to provide a discharge path, the gate voltage of the SR switch S2 is decreased, and the SR switch S2 is turned OFF.

In one embodiment, the mode determination circuit 203 further has a third input terminal coupled to a discrete off-chip resistor R1 through a pin P2 of the secondary control circuit IC2. A voltage signal VTW on the resistor R1 is an adjustable signal representative of the window length TW and can be adjusted by change the resistance of the resistor R1 so that the window length TW can be regulated.

Embodiments of the invention are described herein in the context of one practical non-limiting application, namely, a flyback converter with synchronous rectification. Embodiments of the invention, however, are not limited to such applications, and the techniques described herein may also be utilized in other switching power supply circuit, such as LLC resonant converter with synchronous rectification.

Figure 4:
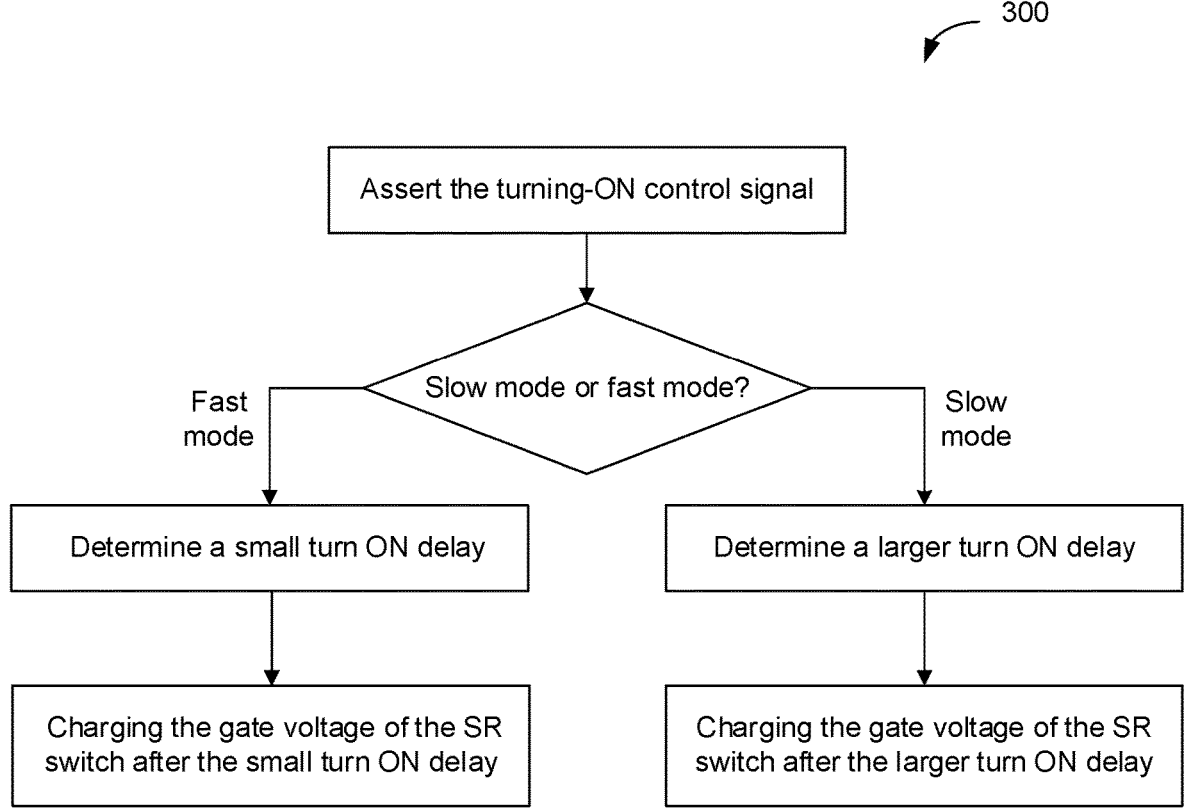
FIG. 4 illustrates a method 300 for turning-on a SR switch of the switching power supply circuit 200 shown in FIG. 3 in accordance with an embodiment of the present invention.

FIG. 4 illustrates a method 300 for turning-on a SR switch of the switching power supply circuit 200 shown in FIG. 3 in accordance with an embodiment of the present invention. The method 300 for turning-on the SR switch comprises: asserting the turning-ON control signal, and when the mode is determined to be the fast mode according to the operation of switching power supply circuit 200, determining a small turn ON delay and charging the gate voltage of the SR switch after the small turn ON delay; when the mode is determined to be the slow mode, determining a larger turn ON delay and charging the gate voltage of the SR switch after the larger turn ON delay. In one embodiment, the turn ON delay for the slow mode is 150 ns, the turn ON delay for the fast mode is 50 ns.

In a further embodiment, when the mode is determined to be the slow mode and the turning-ON control signal SR_on is asserted, and charging the gate voltage of the SR switch with a lower charge current after the larger turn ON delay. When the mode is determined to be the fast mode and the turning-ON control signal SR_on is asserted, and charging the gate voltage of the SR switch with a high charge current after the small turn ON delay. In one embodiment, the charge current for slow mode is 0.25 A, the charge current for fast mode is 2 A.

Figure 5:
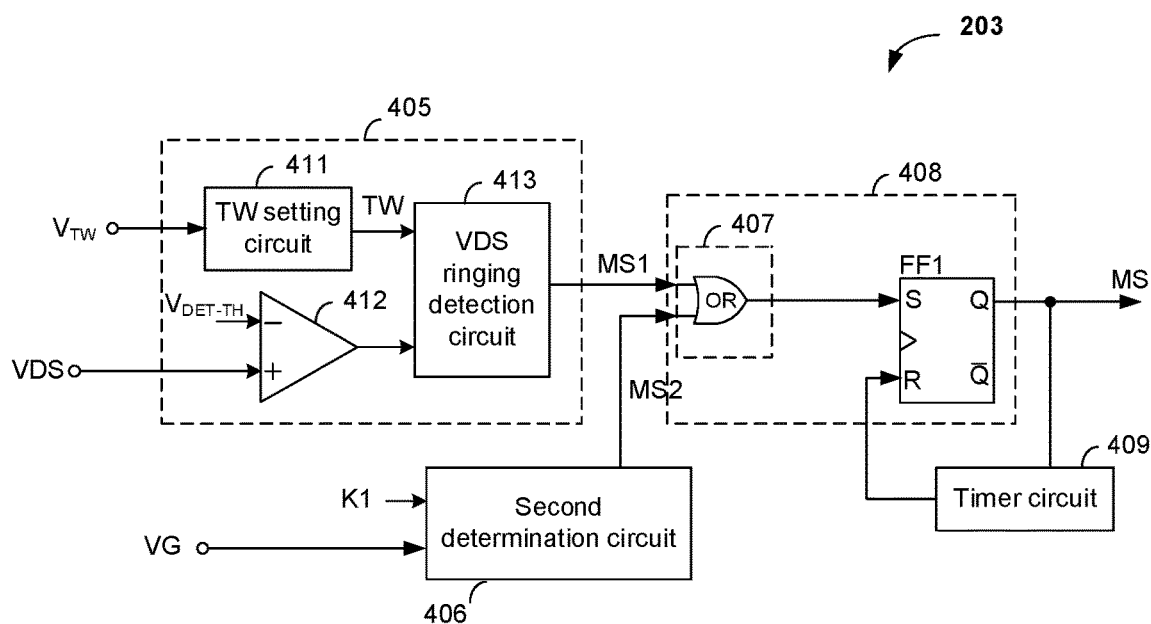
FIG. 5 illustrates a circuit block diagram of a mode determination circuit 203 shown in FIG. 3 in accordance with an embodiment of the present invention.

FIG. 5 illustrates a circuit block diagram of a mode determination circuit 203 shown in FIG. 3 in accordance with an embodiment of the present invention. As shown in FIG. 5, the mode determination circuit 203 comprising a first determination circuit 405, a second determination circuit 406, a logic circuit 408 and a timer circuit 409.

The first determination circuit 405 is configured to detect the VDS ringing in DCM operation. The first determination circuit 405 has first input terminal, a second input terminal and an output terminal, wherein the first input terminal is coupled to receive the drain to source sensing voltage VDS, the second input terminal is coupled to receive the voltage signal VTW representative of the window length TW. A time duration TS of the drain to source sensing voltage VDS higher than the detection threshold Vdet_th is compared with the window length TW, and based on the comparison result, the first determination circuit 405 provides a first mode signal MS1 at the output terminal. In one embodiment, when the time duration TS is detected to less than the window length TW, the first determination circuit 405 provides the first mode signal MS1 having high level.

In the embodiment of FIG. 5, the first determination circuit 405 comprises a TW setting circuit 411, a first comparison circuit 412 and a VDS ringing detection circuit 413. The TW setting circuit 411 is coupled to receive the voltage signal VTW, to set the window length TW for VDS ringing detection. The first comparison circuit 412 has a first input terminal, a second input terminal and an output terminal, wherein the first input terminal is coupled to receive the drain to source sensing voltage VDS of the SR switch S2, the second input terminal is coupled to receive the detection threshold Vdet_th. The VDS ringing detection circuit 413 has a first input terminal, a second input terminal and an output terminal, wherein the first input terminal is coupled to the TW setting circuit 411 to receive the window length TW, the second input terminal is coupled to the output terminal of the first comparison circuit 412, the VDS ringing detection circuit 412 records the time duration TS of the drain to source sensing voltage VDS higher than the detection threshold Vdet_th, and compares the time duration TS with the window length TW, provides the first mode signal MS1 at the output terminal according to the comparison result.

The second determination circuit 406 is configured to detect the transient event. In the embodiment of FIG. 5, the second determination circuit 406 has a first input terminal, a second input terminal and an output terminal, wherein the first input terminal is coupled to receive the secondary control signal VG, the second input terminal is coupled to receive a preset value K1. In one embodiment, the preset value K1 is 5%. The second determination circuit 406 is configured to detect the conduction time of the SR switch cycle by cycle and to provide a change ratio K0 of the conduction time of the SR switch Q2 cycle by cycle. The second determination circuit 406 provides a second mode signal MS2 at the output terminal based on the comparison of the change ratio K0 and the preset value K1. In one embodiment, when the change ratio K0 exceeds the preset value K1, the second determination circuit 406 provides the second mode signal MS2 having high level.

The logic circuit 408 comprises a OR gate circuit 407 and a flip-flop FF1. Wherein the OR gate circuit 407 has a first input terminal, a second input terminal and an output terminal, wherein the first input terminal is coupled to receive the first mode signal MS1, the second input terminal is coupled to receive the second mode signal MS2. The flip-flop FF1 has a setting terminal, a resetting terminal and an output terminal, wherein the setting terminal is coupled to the output terminal of the OR gate circuit 407, the resetting terminal is coupled to the output terminal of the flip-flop FF1 through the timer circuit 409. The flip-flop FF1 provides the mode signal MS at the output terminal. In one embodiment, when any of the first mode signal MS1 and the second mode signal MS2 has high level, the setting terminal of the flip-flop FF1 is triggered, and the flip-flop FF1 provides the mode signal MS having high level, the slow mode is determined.

When the time duration of the mode signal MS with high level exceeds a time limit set by the timer circuit 409, the resetting terminal of the flip-flop FF1 is triggered, the flip-flop FF1 outputs the mode signal MS having low level, the mode determination circuit 203 exits the slow mode and enters into the fast mode.

Figure 6:
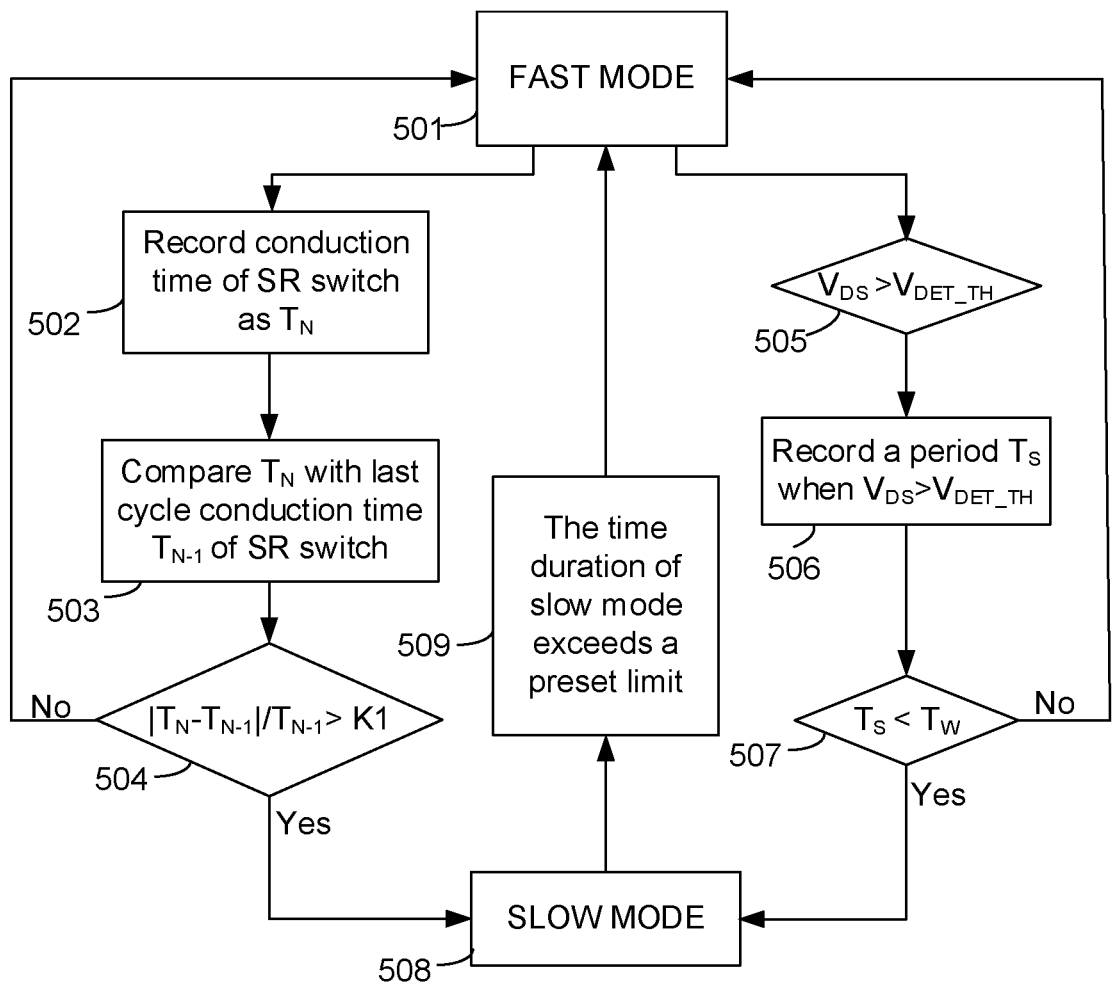
FIG. 6 illustrates a work flow of the mode determination circuit 203 shown in FIG. 5 in accordance with an embodiment of the present invention.

FIG. 6 illustrates a work flow of the mode determination circuit 203 shown in FIG. 5 in accordance with an embodiment of the present invention. This work flow comprises steps 501~509.

At step 501, the mode signal MS is on a low level, and the mode is determined to be the fast mode.

In one hand, at step 502, a conduction time of the SR switch is recorded as $T_N$.

At step 503, the conduction time $T_N$ is compared with last cycle's conduction time $T_{N-1}$ of the SR switch.

At step 504, a change ratio K0 of the conduction time of the SR switch is calculated, $K0=|T_N-T_{N-1}|/T_{N-1}$. The change ratio K0 is compared with a preset value K1. If the change ratio K0 exceeds the preset value K1, go to step 508. If not, go back to step 501. In one embodiment, the preset value is 5%. In other words, when $T_N>105\%\ T_{N-1}$ or $T_N<95\%\ T_{N-1}$, go to step 508.

At step 508, the mode signal MS is on a high level, the mode is determined to be the slow mode.

In the other hand, at step 505, the drain to source sensing voltage VDS is compared with the detection threshold Vdet_th.

At step 506, the time duration of the drain to source sensing voltage VDS higher than the detection Vdet_th is recorded as TS.

At step 507, the time duration TS is compared with the window length TW, if TS<TW, go to step 508, otherwise, go back to step 501.

At step 509, when the time duration of the mode signal MS with high level exceeds a time limit, exits the slow mode and enters into the fast mode.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Figure 7:
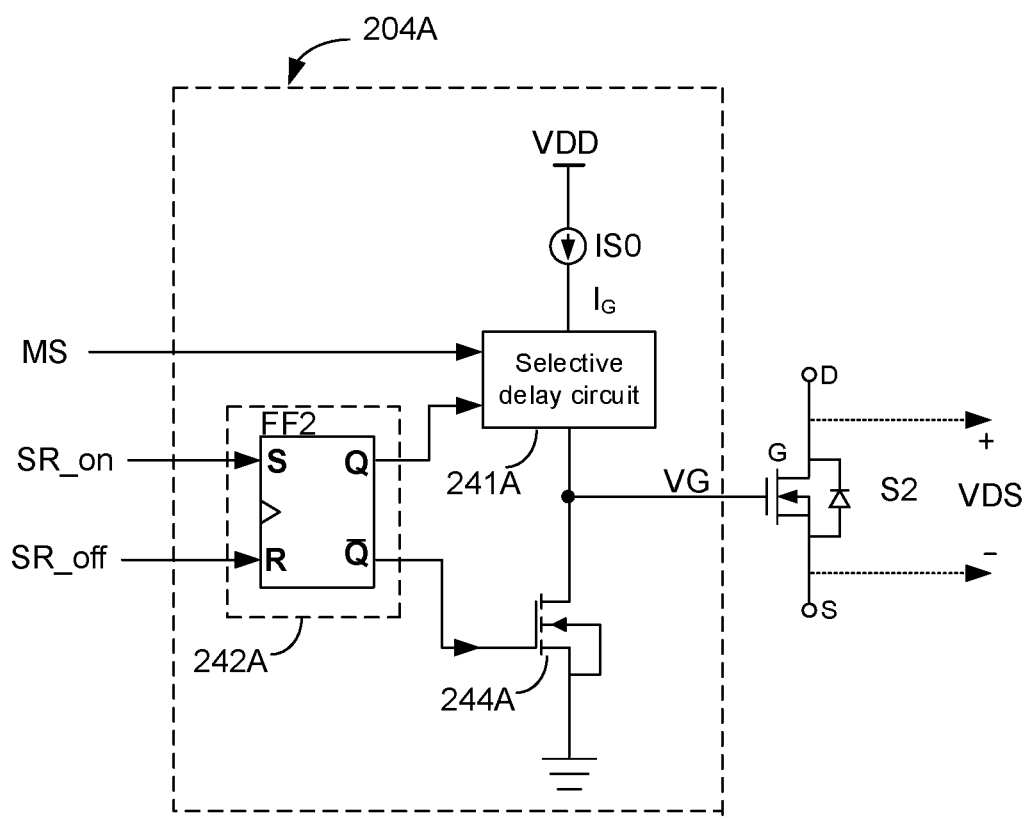
FIG. 7 illustrates a circuit block diagram of a gate driver circuit 204A in accordance with an embodiment of the present invention.

FIG. 7 illustrates a circuit block diagram of a gate driver circuit 204A in accordance with an embodiment of the present invention. As shown in FIG. 7, the gate driver circuit 204A comprises a current source IS0, a selective delay circuit 241A, a logic circuit 242A and a discharge switch 244A. The current source IS0 has a power supply terminal and an output terminal, wherein the power supply terminal is coupled to receive a power supply voltage VDD, the current source IS0 provides a charge current IG at the output terminal. The logic circuit 242A comprises a flip-flop FF2. The flip-flop FF2 has a setting terminal, a resetting terminal, an output terminal and a reversing output terminal, wherein the setting terminal is configured to receive the turning-ON control signal SR_on, the resetting terminal is configured to receive the turning-OFF control signal SR_off. The selective delay circuit 241A has an input terminal, a control terminal, an enable terminal and an output terminal, wherein the input terminal is coupled to the output terminal of the current source IS0, the control terminal is coupled to receive the mode signal MS, the enable terminal is coupled to the output terminal of the flip-flop FF2, the output terminal is coupled to the gate terminal G of the SR switch S2 for providing a charge current to charge the gate voltage of the SR switch S2 based on the mode signal MS and the corresponding turn ON delay.

When the mode signal MS is low level, a small turn ON delay is determined, when the turning-ON control signal SR_on is asserted, the selective delay circuit 241A starts to charge the gate voltage of the SR switch S2 with the charge current IG after the small turn ON delay. With a small turn ON delay, the body diode conduction loss is kept in a fairly low level, the total efficiency is good. When the mode signal MS is high level, a larger turn ON delay is determined, when the turning-ON control signal SR_on is asserted, the selective delay circuit 241A starts to charge the gate voltage of the SR switch S2 with the charge current IG after the larger turn ON delay. With the larger turn ON delay, the shoot-through problem can be avoided. The discharge switch 244A is coupled between the gate terminal of the SR switch S2 and ground, has a control terminal coupled to the reversing output terminal of the flip-flop FF2. When the turning-OFF control signal SR_off is asserted, the discharge switch 244A is turned ON to provide a discharge path, the gate voltage of the SR switch S2 is decreased, and the SR switch S2 is turned OFF.

Figure 8:
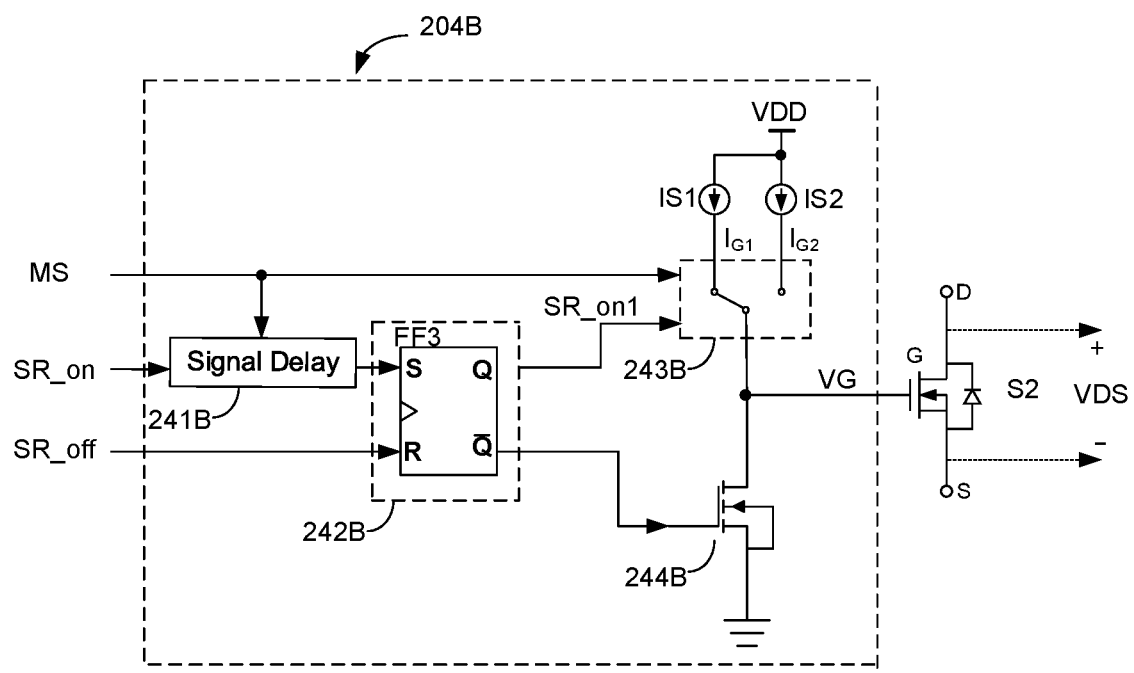
FIG. 8 illustrates a circuit block diagram of a gate driver circuit 204B in accordance with another embodiment of the present invention.

FIG. 8 illustrates a circuit block diagram of a gate driver circuit 204B in accordance with another embodiment of the present invention. In the embodiment of FIG. 8, the gate driver 204B comprises a signal delay circuit 241B, a logic circuit 242B, a first current source IS1 and a second current source IS2, a selecting circuit 243B and a discharge switch 244B. The signal delay circuit 241B has an input terminal, a control terminal and an output terminal, wherein the input terminal is configured to receive the turning-ON control signal SR_on, the control terminal is configured to receive the mode signal MS, based on the mode signal MS, the signal delay circuit 241B delays the turning-ON control signal SR_on by a corresponding turn ON delay, and provides a delayed turning ON control signal SR_on1. In detail, when the mode signal MS is low level, the delayed turning-ON control signal SR_on1 lags the turning-ON control signal SR_on by the small turn ON delay. When the mode signal MS is high level, the delayed turning-ON control signal SR_on1 lags the turning-ON control signal SR_on by the larger turn ON delay.

The logic circuit 242B comprises a flip-flop FF3, the flip-flop FF3 has a setting terminal, a resetting terminal, an output terminal and a reversing output terminal, wherein the setting terminal is coupled to the output terminal of the signal delay circuit 241B to receive the delayed turning-ON control signal SR_on1, the resetting terminal is configured to receive the turning-OFF control signal SR_off.

The first and second current sources IS1 and IS2, respectively, have a power supply terminal coupled to receive a power supply voltage VDD and an output terminal configured to provides a first charge current IG1 and a second charge current IG2, respectively. The first charge current IG1 is higher than the second charge current IG2. The selecting circuit 243B has a first input terminal, a second input terminal, a control terminal, an enable terminal and an output terminal, wherein the first input terminal is coupled to the output terminal of the first current source IS1 to receive the first charge current IG1, the second input terminal is coupled to the output terminal of the second current source IS2 to receive the second charge current IG2, the control terminal is coupled to receive the mode signal MS, the enable signal is coupled to the output terminal of the flip-flop FF3, based on the mode signal MS, when the turning-ON control signal SR_on is asserted, the selecting circuit 243B selects one of the first charge current IG1 and the second charge current IG2, and charges the gate terminal voltage of the SR switch S2 with the selected charge current. When the mode signal MS has a low level, the selecting circuit 243B selects the first charge current IG1 to the gate terminal of the SR switch S2, and charges the gate voltage of the SR switch S2 with the first charge current IG1. When the mode signal MS has high level, the selecting circuit 243B selects the second charge current IG2 to the gate terminal of the SR switch S2, and charges the gate voltage of the SR switch S2 with the second charge current IG2. The discharge switch 244B is coupled between the gate terminal of the SR switch S2 and ground, the control terminal of the discharge switch 244B is coupled to the reversing terminal of the flip-flop FF3. When the turning-OFF control signal SR_off is asserted, the discharge switch 244B is turned ON to generate a discharge path, and the gate voltage of the SR switch is decreased and the SR switch S2 is turned OFF.

Figure 9:
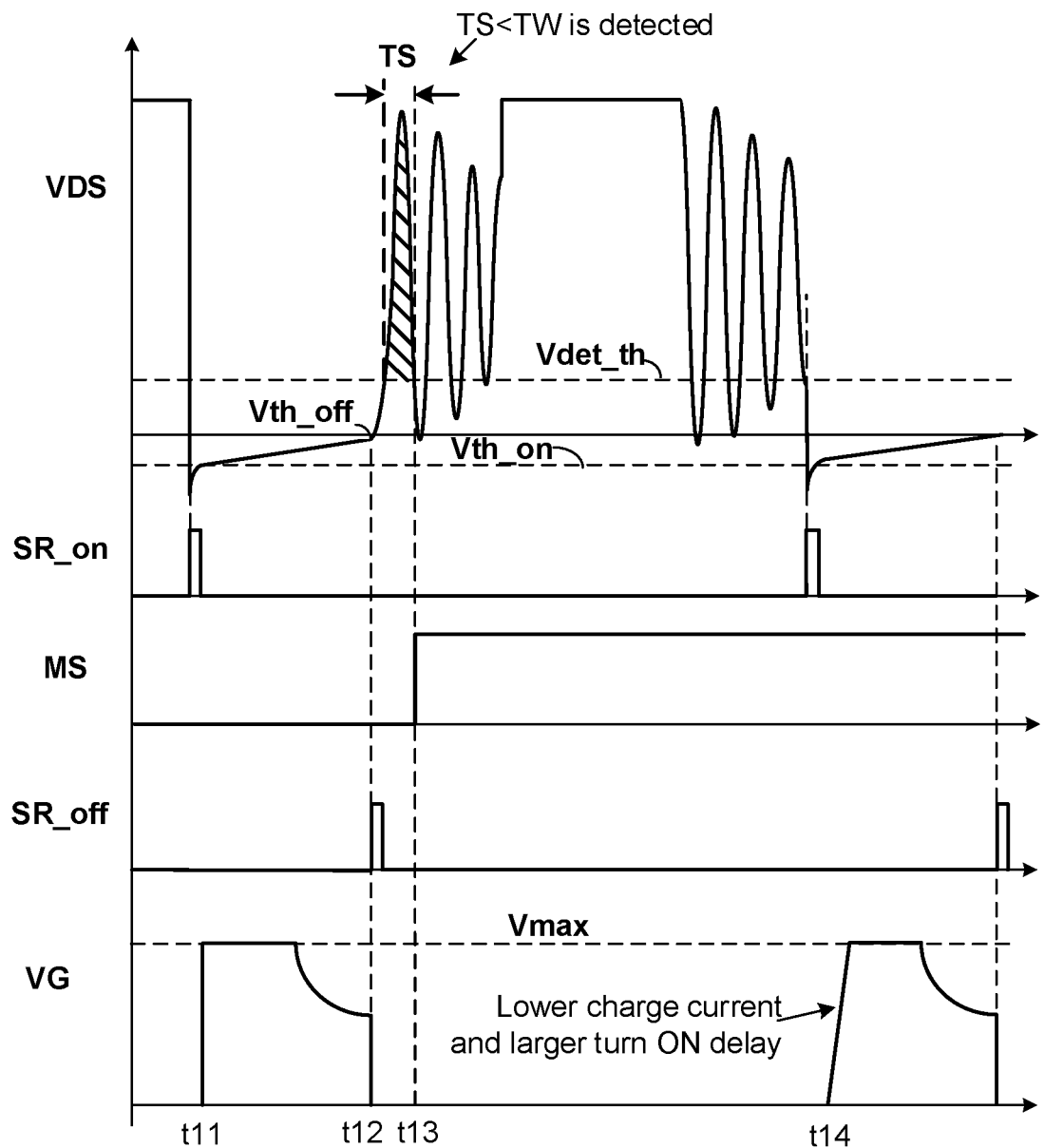
FIG. 9 illustrates working waveforms of a switching power supply circuit in accordance with an embodiment of the present invention.

Several of the details of the embodiments described below with reference to FIG. 9 and FIG. 10. FIG. 9 illustrates working waveforms of a switching power supply circuit in accordance with an embodiment of the present invention. As shown in FIG. 9, at time t11, the drain to source sensing voltage VDS decreases to below the turn ON threshold Vth_on, the turning-on control signal SR_on is asserted, the gate voltage of the SR switch is charged with the high charge current IG1 after the small turn ON delay, the gate voltage of the SR switch increases until to the maximum voltage Vmax, to turn ON the SR switch. In one embodiment, the high charge current IG1 is 2 A, the small turn ON delay is 50 ns.

At time t12, the drain to source sensing voltage VDS is increased to above the turn OFF threshold Vth_off, the turning-OFF control signal SR_off is asserted, the discharge switch is turned ON, and the gate voltage of the SR switch is decreased, the SR switch is turned OFF.

At time t13, the time duration TS of the drain to source sensing voltage VDS higher than the detection threshold Vdet_th is less than the window length TW, the mode signal MS transits from low level to high level, the slow mode is determined.

At time t14, the turning-ON control signal SR_on is asserted again, and the mode signal MS is high level, the gate voltage of the SR switch is charged with a lower charge current IG2 after the larger turn ON delay, the gate voltage of the SR switch increases until to the maximum voltage Vmax. In one embodiment, the lower charge current IG2 is 250 mA, the larger turn ON delay is 150 ns.

Figure 10:
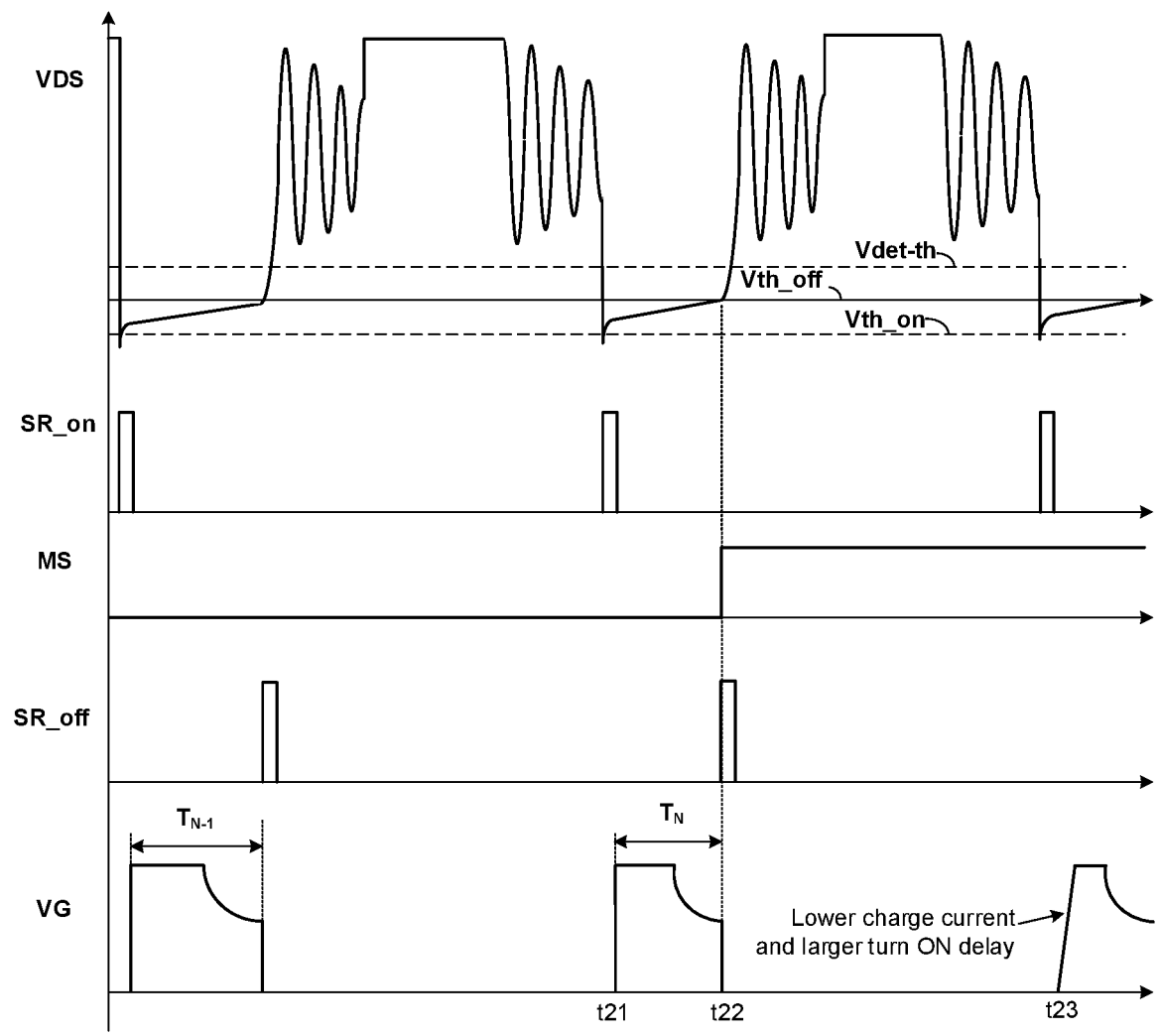
FIG. 10 illustrates working waveforms of a switching power supply circuit in accordance with another embodiment of the present invention.

FIG. 10 illustrates working waveforms of a switching power supply circuit in accordance with another embodiment of the present invention. As shown in FIG. 10, at time t21, the turning-ON control signal SR_on is asserted, the mode signal MS is low level. The gate voltage of the SR switch is charged with the high charge current IG1 after the small turn ON delay, the gate voltage of the SR switch increases until to the maximum voltage Vmax, to turn ON the SR switch.

At time t22, the turning-OFF control signal SR_off is asserted and the SR switch is turned OFF. At the same time, the conduction time of the SR switch is recorded as $T_N$. When $T_N > 105\% \ T_{N-1}$, the mode signal MS transits from low level to high level.

At time t23, the turning-ON control signal SR_on is asserted again, the mode signal MS is high level, and the slow mode is determined. The gate voltage of the SR switch is charged with the lower charge current IG2 after the larger turn ON delay, the gate voltage of the SR switch increases to control the turning-ON of the SR switch, the gate voltage of the SR switch increases until the maximum voltage Vmax.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A secondary control circuit used in a switching power supply circuit with synchronous rectification, wherein the switching power supply circuit comprises an energy storage component and a synchronous rectifier (SR) switch coupled to a secondary side of the energy storage component, the SR switch has a drain terminal, a source terminal and a gate terminal, the secondary control circuit comprising:
   a turning-ON control circuit configured to provides a turning-ON control signal based on a comparison of a drain to source sensing voltage of the SR switch and a turn ON threshold;
   a mode determination circuit configured to provide a mode signal to determine a turn ON delay based on a detection of a transient event or ringing of the drain to source sensing voltage of the SR switch, wherein the mode signal has a first level indicating a fast mode and a second level indicating a slow mode; and
   a gate driver circuit configured to drive the SR switch, wherein when the turning-ON control signal is asserted, based on the mode signal, the gate driver circuit charges a gate voltage of the SR switch after the turn ON delay, to turn ON the SR switch.

2. The secondary control circuit of claim 1, wherein when a change ratio of conduction time of the SR switch cycle by cycle is higher than a preset value, the mode signal becomes the second level.

3. The secondary control circuit of claim 1, wherein when a time duration of the drain to source sensing voltage of the SR switch being higher than a detection threshold is less than a window length, the mode signal becomes the second level.

4. The secondary control circuit of claim 1, further comprises a turning-OFF control circuit configured to provide a turning-OFF control signal based on a comparison of the drain to source sensing voltage and a turn OFF threshold, wherein when the turning-OFF control signal is asserted, the SR switch is turned OFF.

5. The secondary control circuit of claim 4, wherein the gate driver circuit comprises:
   a current source having a power supply terminal and an output terminal, wherein the power supply terminal is coupled to receive a power supply voltage;
   a logic circuit having a setting terminal to receive the turning-ON control signal, a resetting terminal to receive the turning-OFF control signal, an output terminal and a reversing output terminal;
   a selective delay circuit having an input terminal, an enable terminal, a control terminal and an output terminal, wherein the input terminal is coupled to the output terminal of the current source, the enable terminal is coupled to the output terminal of the selective delay circuit, the control terminal is coupled to receive the mode signal, the output terminal is coupled to the gate terminal of the SR switch, and when the turning-ON control signal is asserted, based on the mode signal, the selective delay circuit selects one of a first turn ON delay for the fast mode and a second turn ON delay for the slow mode to charge the gate voltage of the SR switch, wherein the first turn ON delay is less than the second turn ON delay; and
   a discharge switch coupled between the gate terminal of the SR switch and ground, wherein the discharge switch has a control terminal coupled to the reversing terminal of the logic circuit.

6. The secondary control circuit of claim 4, wherein the mode determination circuit is further configured to determine a charge current, and when the turning-ON control signal is asserted, based on the mode signal, the gate driver circuit charges the gate voltage of the SR switch with the charge current after the turn ON delay, to turn ON the SR switch.

7. The secondary control circuit of claim 6, wherein the gate driver circuit comprises:
   a signal delay circuit having an input terminal, a control terminal and an output terminal, wherein the input terminal is coupled to receive the turning-ON control signal, the control terminal is coupled to receive the mode signal, and based on the mode signal, the signal delay circuit delays the turning-ON control signal by the turn ON delay and provides a delayed turning-ON control signal at the output terminal;
   a logic circuit having a setting terminal to receive the delayed turning-ON control signal, a resetting terminal to receive the turning-OFF control signal, an output terminal and a reversing output terminal;
   a first current source having a power supply terminal to receive a power supply voltage and an output terminal for providing a first charge current for the fast mode;
   a second current source having a power supply terminal to receive the power supply voltage and an output terminal for providing a second charge current for the slow mode;
   a selecting circuit having a first input terminal, a second input terminal, an enable terminal, a control terminal and an output terminal, wherein the first input terminal is coupled to the output terminal of the first current source, the second input terminal is coupled to the output terminal of the second current source, the enable terminal is coupled to the output terminal of the logic circuit, the control terminal of the selecting circuit is coupled to receive the mode signal, the output terminal of the selecting circuit is coupled to the gate terminal of the SR switch, and when the turning-ON control signal is asserted, based on the mode signal, the selecting circuit selects one of the first charge current and the second charge current to charge the gate voltage of the SR switch, wherein the first charge current is higher than the second charge current; and a discharge switch coupled between the gate terminal of the SR switch and ground, wherein the discharge switch has a control terminal coupled to the reversing output terminal of the logic circuit.

8. The secondary control circuit of claim 1, wherein when a time duration of the mode signal having the second level exceeds a time limit, the mode signal transits from the second level to the first level.

9. A switching power supply circuit with synchronous rectification, comprising:

an energy storage component having a primary side and a secondary side;

a synchronous rectifier (SR) switch coupled to the secondary side of the energy storage component, wherein the SR switch has a drain terminal, a source terminal and a gate terminal;

a secondary control circuit, comprising:
  a turning-ON control circuit configured to provide a turning-ON control signal based on a comparison of a drain to source sensing voltage of the SR switch and a turn ON threshold;
  a turning-OFF control circuit configured to provide a turning-OFF control signal based on a comparison of the drain to source sensing voltage of the SR switch and a turn OFF threshold;
  a mode determination circuit configured to provide a mode signal to determine a turn ON delay based on a detection of a transient event or ringing of the drain to source sensing voltage of the SR switch, wherein the mode signal has a first level indicating a fast mode and a second level indicating a slow mode; and
  a gate driver circuit configured to drive the SR switch, wherein when the turning-ON control signal is asserted, the gate driver circuit charges a gate voltage of the SR switch after the turn ON delay based on the mode signal, to turn ON the SR switch, and when the turning-OFF control signal is asserted, the SR switch is turned OFF.

10. The switching power supply circuit of claim 9, wherein when a change ratio of conduction time of the SR switch cycle by cycle is higher than a preset value, the mode signal becomes the second level.

11. The switching power supply circuit of claim 9, wherein when a time duration of the drain to source sensing voltage of the SR switch being higher than a detection threshold is less than a window length, the mode signal becomes the second level.

12. The switching power supply circuit of claim 9, wherein the mode determination circuit is further configured to determine a charge current, and when the turning-ON control signal is asserted, based on the mode signal, the gate driver circuit charges the gate voltage of the SR switch with the charge current after the turn ON delay, to turn ON the SR switch.

13. The switching power supply circuit of claim 9, wherein the turn ON delay for the slow mode is larger than that for the fast mode, and is not larger than 5% of a switching cycle of the switching power supply circuit.

14. The switching power supply circuit of claim 9, wherein when a time duration of the mode signal having the second level exceeds a time limit, the mode signal transits from the second level to the first level.

15. A method to control a synchronous rectifier (SR) switch in a switching power supply circuit including an energy storage component coupled to the SR switch, the SR switch comprises a drain terminal, a source terminal and a gate terminal, the method comprising:

generating a turning-ON control signal by comparing a drain to source sensing voltage of the SR switch with a turn ON threshold;

generating a turning-OFF control signal by comparing the drain to source sensing voltage with a turn OFF threshold;

generating a mode signal to determine a turn ON delay by detecting a transient event or ringing of the drain to source sensing voltage of the SR switch, wherein the mode signal is high level indicating a slow mode and is low level indicating a fast mode;

when the turning-ON control signal is asserted, charging a gate voltage of the SR switch after the turn ON delay based on the mode signal, to turn ON the SR switch; and turning OFF the SR switch when the turning-OFF control signal is asserted.

16. The method of claim 15, wherein when a change ratio of conduction time of the SR switch cycle by cycle is higher than a preset value, the mode signal becomes high level.

17. The method of claim 15, wherein when a time duration of the drain to source sensing voltage of the SR switch being higher than a detection threshold is less than a window length, the mode signal becomes high level.

18. The method of claim 15, wherein the turn ON delay for the slow mode is larger than that for the fast mode, and is not larger than 5% of a switching cycle of the switching power supply circuit.

19. The method of claim 15, wherein when a time duration of the mode signal having high level exceeds a time limit, the mode signal transits from high level to low level.

20. The method of claim 15, wherein the mode signal is further configured to determine a charge current for charging the gate voltage of the SR switch, and the charge current for the slow mode is lower than that for the fast mode.

* * * * *